United States Patent [19]

Woodward

[11] 4,083,936

[45] Apr. 11, 1978

[54] MANUFACTURE OF PHOSPHORIC ACID USING ACID PHOSPHATE ESTER ANTIFOAMING COMPOSITIONS

[76] Inventor: Fred E. Woodward, 200 Churchill Rd., West Palm Beach, Fla. 33405

[21] Appl. No.: 615,177

[22] Filed: Sep. 19, 1975

[51] Int. Cl.$^2$ .............................................. C01B 25/16
[52] U.S. Cl. ...................................... 423/320; 252/358
[58] Field of Search ............... 423/317, 320; 252/318, 252/321, 358

[56] References Cited

U.S. PATENT DOCUMENTS

| | | | |
|---|---|---|---|
| 2,147,415 | 2/1939 | Tucker | 252/321 |
| 2,200,485 | 5/1940 | Broderson et al. | 252/321 |
| 2,360,135 | 10/1944 | Hull et al. | 252/321 |
| 2,407,589 | 9/1946 | Treman et al. | 252/318 |
| 2,797,198 | 6/1957 | Chappell | 252/321 |
| 2,903,432 | 9/1959 | Hwa | 252/321 |
| 3,277,217 | 10/1966 | Nehmsmann et al. | 252/358 |

FOREIGN PATENT DOCUMENTS

| | | | |
|---|---|---|---|
| 43-19205 | 8/1968 | Japan | 423/320 |
| 1,082,090 | 8/1966 | United Kingdom | 252/321 |

OTHER PUBLICATIONS

Chemical Industries, vol. 64, 5/49, *Chemical Antifoaming Agents*, Ross, pp. 757 to 759.

*Primary Examiner*—O. R. Vertiz
*Assistant Examiner*—Eugene T. Wheelock

[57] ABSTRACT

In the manufacture of phosphoric acid by the acidulation of phosphate rock detrimental foaming is reduced by the use of certain phosphate esters of aliphatic alcohols as defoaming agents. Aqueous emulsions of such esters comprise novel, useful compositions of matter.

6 Claims, No Drawings

MANUFACTURE OF PHOSPHORIC ACID USING ACID PHOSPHATE ESTER ANTIFOAMING COMPOSITIONS

DEFOAMERS FOR PHOSPHORIC ACID PRODUCTION

When phosphate rock, a natural product mined and purified from sand and clay as in Florida, Morocco and the western United States, is converted to phosphoric acid by the so-called "wet process", it is added as a dry, ground powdery material to a mixture of phosphoric acid and sulfuric acid in a digester, or reactor vessel. The phosphoric acid dissolves much of the calcium phosphate (Apatite) which then reacts with the sulfuric acid to release phosphoric acid and to form a calcium sulfate precipitate. The principal reaction of the process may be represented by the following equation:

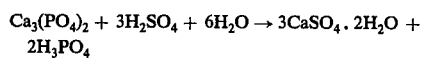

$$Ca_3(PO_4)_2 + 3H_2SO_4 + 6H_2O \rightarrow 3CaSO_4 \cdot 2H_2O + 2H_3PO_4$$

There is present in the natural calcium phosphate, a considerable portion of limestone or calcium carbonate in other forms as well as calcium fluoride and organic material. The rock comes from dried sea or lake beds and is made up of the bones and teeth of prehistoric animals and fish, etc. The process therefore involves side reactions which cause the evolution of large volumes of carbon dioxide, some hydrogen flouride and results in the development of copious amounts of foam.

The process must be carried out hot, to give gypsum crystals (calcium sulfate dihydrate) of a size and structure which will filter rapidly and also to obtain adequate rates of solution and reaction. This requires the use of large reactor vessels, which are made of steel and lined with rubber, both to prevent attack of the steel and to prevent erosion, as the large mass of solid slurry is agitated.

Normally, defoamers are added to the reaction during this process to keep the foam generation to a minimum. There are usually organic materials, primarily mixtures of tall oil derived fatty acids, and a suitable wetting or spreading agent. These products cause a drastic swelling and a softening of the rubber lining of the reactor with subsequent loss of adhesion, flaking or spalling off of large pieces of rubber and resulting economic loss from relining costs and downtime for this repair.

I have now discovered that certain phosphate esters according to this invention will effectively and economically perform as defoamers while at the same time, have a substantially less deleterious effect on the rubber lining of the reactor vessel. These esters comprise the phosphate esters of aliphatic alcohols having a carbon atom content of 6–26. Aliphatic alcohols having 16–26 carbon atoms are particularly advantageous for preparing the esters for the purposes of this invention. A mixture of alcohols of varying chain length may be used and, in fact, the usual, available commercial sources of raw materials will constitute such mixtures.

Alcohols that are highly effective for the purpose of this invention include those produced by the oxo process from mono-olefinic straight chain hydrocarbons (as exemplified by the commercial products of Shell Chemical Co., sold as Neodols). These products have random chain lengths. The process may be optimized around any carbon length but in commercial practice today a range from $C_{12}$ to $C_{15}$ alcohols are produced which have 20% branched (methyl) chain primary alcohols; the remainder being straight chain primary.

Alternatively, suitable alcohols may be produced by telomerization of ethylene with a Ziegler-type aluminum catalyst and with subsequent decomposition to fatty alcohols. Alcohols with even carbon numbers are produced by this process (from $C_4$ to $C_{26}$) all straight chain and primary. The products are separated by distillation into nearly pure even carbon alcohol products or a mixture of 2 or 3 contiguous products. Preferred alcohols from this process, when converted into a phosphate ester, are the mixtures of $C_{16}$, $C_{18}$, $C_{20}$, and $C_{22}$ alcohols, or the same alcohols in essentially pure form.

Also suitable for use are the phosphate esters of aliphatic alcohols containing up to 45% hydrocarbons of substantially the same boiling point. Such phosphate esters may be formed, for example, from the residue (distilled) from the distillation of the fatty alcohols from the decomposed telomerization reaction which leaves a mixture of $C_{20}$ and higher fatty alcohols mixed with up to 45% of normal paraffins with boiling points essentially equal to the $C_{20}$ to $C_{26}$ fatty alcohols.

Fatty alcohols produced by the catalytic reduction of naturally occurring fatty acid methyl esters by hydrogen are also suitable and desirable for conversion to phosphate esters for use in this invention.

The phosphate esters of alcohols produced by the standard oxo reaction from branched olefins also make suitable defoaming agents. These alcohols are normally, in commercial practice, fractionated to essentially single carbon number alcohols and useful ones range from $C_6$ to $C_{13}$. Higher carbon number alcohols of this type are also useful, but are not readily available commercially.

The phosphate esters may be prepared by reacting an aliphatic alcohol, such as those referred to above, with an oxy acid of pentavalent phosphorous, such as orthophophoric acid, pyrophosphoric acid, polyphosphoric acid, phosphorous pentoxide or mixture of these. The reaction may be illustrated by the following equation:

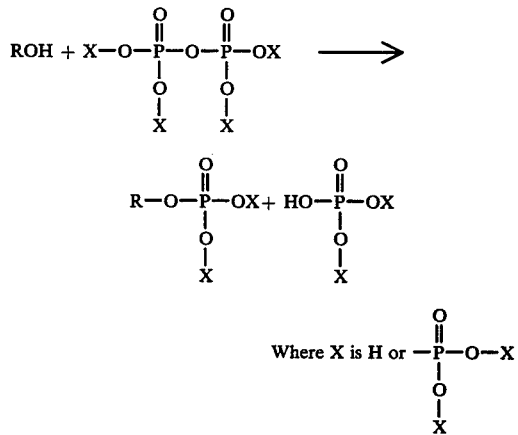

And R is an alkyl of 6 to 26 carbon atoms.

This is a schematic over simplification of the reaction which proceeds after the initial esterification-solubilization step as a complex series of ester interchange reactions to give that mixture of esters and acids which is most stable. The exact mixture is a function of the solvent properties of the alcohol (ratio of alkyl chain length to OH) and of the degree of dehydration of the phosphoric acid-phosphoric anhydride composition.

The latter may be represented schematically by the following:

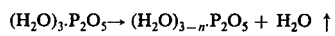
$$(H_2O)_3 \cdot P_2O_5 \rightarrow (H_2O)_{3-n} \cdot P_2O_5 + H_2O \uparrow$$

When
- $n = 0$, product is $H_3PO_4$
- $n = 1.0$, product is metaphosphoric acid
- $n = 3$, product is phosphoric anhydide
- $n = 2.8$, product is 115% polyphosphoric acid In general the reaction is carried out by mixing the acid and alcohol while heating at 70° C to 125° C. The reaction proceeds to completion within one half to 3 hours. The esters thus formed when added to the reaction mixture of phosphate rock and sulfuric acid significantly reduce the foam normally produced by such reaction.

Advantageously, the esters may be employed as salts, particularly the esters of the longer chain alcohols having $C_{16}$ and higher chain length. This is related to the fact that the phosphate ester additives, in accordance with the present invention, are advantageously prepared in liquid form, to facilitate handling and introduction in the reactor vessel, and preferrably in the form of a concentrated aqueous dispersion at concentrations of from 30% to 55% by weight.

The phosphate esters of $C_6$ to $C_{16}$ alcohols are liquids in their anhydrous acid form and may be added in that form. These mixed with higher alcohol phosphates such as the $C_{12}$ to $C_{14}$ alcohol phosphates, and especially with higher branched alcohol phosphates, such as, tridecyl alcohol made from propylene tetramer, are also low enough in melting point to be shipped as anhydrous liquids. They may also be neutralized with ammonia or bases of alkali metals, such as potassium or sodium hydroxide to give reasonably concentrated solutions or slurries in water of 30 to 60%.

The straight chain $C_{16}$, $C_{18}$, $C_{20}$ and higher alcohol phosphates and their mixtures, however, are high in melting point and difficult to dissolve, disperse, or emulsify suitably. If neutralized in water as the sodium, potassium, or ammonium salts, they tend to be too "insoluble" in water, and at reasonable concentrations of 20–50% form stiff pastes in water.

I have found, however, that such higher alcohol ($C_{16}$ and higher) phosphate esters may be dispersed with the aid of an additional wetting agent, dispersing agent or emulsifier and that high solids "dispersions" (40–55% solids in water) of these higher alcohol phosphate esters may be made. Further, I have found that in addition to neutralization with sodium, potassium or ammonium hydroxides, they may be neutralized with calcium hydroxide or magnesium hydroxide (the former is preferred) while still forming fluid pumpable dispersions of 40–55% solid concentrations. Normally, only 3 to 10% (on a solids basis) of such a dispersing agent is required, although less or considerably more may be necessary or desirable in some cases. Non-ionic surfactants which contain (on a weight basis) an average of about 60–85% ethylene oxy units are preferred, but other non-ionic surfactants are suitable and preferrably those which are good "lime soap dispersing agents". According to the method of Borghetty and Berman, this is measured by the : grams of dispersing agent × 100 required to disperse sodium oleate in 340 ppm hard water/weight of sodium oleate; the lower the better. An index of 10 or lower is preferred. Many non-ionic surfactants are also suitable as would be recognized by those skilled in the art.

Examples of products which are suitable particularly for stabilizing the alkaline earth salts of this invention but which may also be beneficially used in other salts of this invention are:

- sodium stearoyl-N-methyl taurate (and oleyl, lauroyl, etc.)
- sodium lauroyl isenthionate
- lauryl alcohol + 7 moles ethylene oxide
- $C_{11-15}$ straight chain alcohol ethoxylated with 60% by weight ethylene oxide
- Nonyl-phenol + 9 moles ethylene oxide
- Oleic acid + 15 moles of ethylene oxide
- polypropylene oxide (MW 600) + 40% ethylene oxide (by weight)

Many other appropriate surfactants will be apparent to those skilled in the art. Although the use of surfactants in the practice of this invention is normally best at low levels of the most efficient product there is included within the scope of this invention the use of mixtures of high levels of less efficient emmulsifying dispersing agents. In fact, it is possible to use a mixture of a hydrophobic phosphate ester and a hydrophylic phosphate ester such that the resulting mixture is readily dispersible by one or more of the techniques taught herein.

The phosphate ester salts of the invention may be readily prepared by adding the molten phosphate ester to an aqueous solution or dispersion of a metal hydroxide such as those referred to above. In the case of esters derived from $C_{16}$ alcohols the neutralizing salt such as the alkaline earth metal hydroxides mentioned above is advantageously employed in aqueous mixture with one or more of the emulsifying agents described above. Various alternative methods may be used as will be readily apparent to those skilled in the art. For example, in preparing a dispersion of an alkaline earth metal salt of a $C_{16}$ or higher phosphate ester, a water soluble emulsifying agent may be added to the molten ester and a water dispersion of the neutralizing salt then added to the molten ester. The amount of the neutralizing salt added is based on the acid number of the phosphate ester (mg. of KOH needed to neutralize 1 g of the ester to a pH of 10).

As a further step in the process of producing such high solids products it is sometimes necessary or desirable to subject the dispersions to a high shear action such that the particles are all reduced to a uniform small size and thus free of "grit" and capable of passing through a 200 mesh screen with no more than 0.5% of the solids remaining on the screen.

There are vaious high shear devices which are suitable. Among them may be mentioned the CP model "Multi-Flo" homogenizer manufactured by the CP division of St. Regis, in Lake Mills, Wis.; and Faulin Corporation's homogenizer. These mills typically operate by pumping the dispersion through a spring-loaded valve at pressure drops from 1,000 psi up to 10,000 psi. Other homogenizers which operate at less drastic shear rates may be suitable, such as Scvarig's "Attriter" mill, the Jones (Division of Beloit Corporation) Model HP "Hi-Intensity" mill; the "Kady" mill of Kinetic Dispersion Corporation.

A series of phosphation reactions were run with Epal C20 +. The mole ratio of polyphosphoric acid—115-%—to alcohol was varied over a range and the products were titrated for 1°, 2° phosphate esters and for orthophosphoric acid (with CaCl$_2$ addition—see below), to determine compositions.

The titrations were run by dissolving a 3 g. sample in 30 ml. of isopropanol and 10 ml. of water at about 55° C. This was then titrated with approximately 1 N NaOH (aqueous) and the pH plotted at 1 ml. increments. The temperature was kept above 50° C.

The first inflection point titrates to the following species.

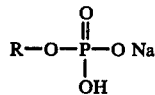

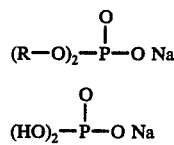

The second inflection point titrates to:

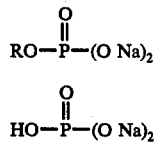

There was then added calcium chloride (10 ml. of 10%) which precipitates ortho-phosphate presumeably and releases one mole of acid for each mole of H$_3$PO$_4$.

The following Table I gives calculations based on the titration curves. To aid in thinking in terms of the course of the esterification and in terms of the titration results, I have put everything on the basis of equivalents per 100 g. of polyphosphoric acid. To convert to weight percentages, use an arbitary 390 (= C$_{22}$) for the mono ester and 780 for the diester.

For a 3.00 g. sample of I-(6)-66A which was made with 16.42% polyphosphoric acid contains 0.492 g. of polyphosphoric acid (Poly P × 115% ÷ 82 = 0.0070 moles of H$_3$PO$_4$).

The procedure used for preparation of the phosphate ester given in Example 3, except that the ratio of polyphosphoric acid (115%) to Epal C20+ (a mixed fatty alcohol also described in Example 3) was varied from 12.9% of the total reaction mixture to 19.6%.

TABLE I

| %Poly-Phosphoric Acid | Relative equivalents of mono and di(alkyl) ester from titration curves | | | Weight percents of mono and diesters. | | |
|---|---|---|---|---|---|---|
| | Strong H+ (mono & di) | Weak H+ (mono) | H$_3$PO$_4$ (note 1) | Mono | Di | H$_3$PO$_4$ |
| | (e.g./100 g. of Polyphosphoric) | | | | | |
| 12.9% | 1.34 | 1.34 | .68 | 34.4% | 0% | 7.2% |
| 13.5% | 1.15 | 1.02 | .26 | 40% | 13.7% | 2.9% |
| 16.5 | 1.40 | 1.42 | .46 | 61% | 0 | 6.2% |
| 19.6 | 1.17 | 1.04 | .51 | 41% | 20% | 8.2% |

Phosphate esters of stearyl alcohol were prepared using both 115% polyphosphoric acid and phosphorous pentoxide. Analytical data on these preparations are presented in Table II following titrations and calculations on the free acid reaction mixtures.

The phosphation reaction with phosphorous pentoxide presented a problem in that undissolved particles remained even after 9 hours at 80°-110° C. The calcium salts of these two esters were prepared by adding the molten ester to a slurry of hydrated lime and a surfactant at 60° C.

A 30% suspension of the calcium salt of the ester prepared from polyphosphoric acid was a thixotropic liquid at pH 11, after being homogenized.

A 20% suspension of the calcium salt of the phosphate ester prepared from phosphorous pentoxide was a liquid at pH 11, but the particles remained grainy even after 3 minutes at high speed in a waring blender and one pass through a homogenizer.

TABLE II

ANALYSIS OF PHOSPHATE ESTERS OF STEARYL ALCOHOL

| | | Ratio of POP/OH | Strong H+ | Weak H+ | H$_3$PO$_4$ | Monoester | diester |
|---|---|---|---|---|---|---|---|
| | | (note 1) | (note 2) | | | (note 3) | |
| 75.7% | Alfol 18 (C$_{18}$H$_{37}$—OH) (OH# = 202, MW = 277) | .732 | 1.14 (.97) | 1.12 (.955) | .48 (.41) | .66 | .02 |
| 24.3% | Polyphosphoric acid | | | | | | |
| 84.7% | Alfol 18 | .708 | .90 | .56 (.98) | 0 (.61) | .56 | .34 |
| 15.3% | Phosphorous pentoxide | | | | | | |

Note 1: The equivalent weight per POP was calculated from an analysis supplied by FMC.

| | | M.W. | eq.wt./POP | eq.wt./POP × % in Poly P |
|---|---|---|---|---|
| 5% | H$_3$PO$_4$ | 98 | — | — |
| 16% | H$_4$P$_2$O$_7$ | 178 | 178 | 28.5 |
| 17% | H$_5$P$_3$O$_{10}$ | 258 | 129 | 21.9 |
| 16% | H$_6$P$_4$O$_{13}$ | 338 | 119 | 19.0 |
| 46% | Higher | 578 ave | 96.5 | 44.4 |
| | | | | 113.8 × 100/95 = 120 |

Note 2: These numbers are expressed as moles per 100g. of polyphosphoric acid added, calculated by
  ml. × normality of NaOH × 10
  ─────────────────────────────
  wt. sample × % Poly P added
For the preparation with P$_2$O$_5$ a factor of

TABLE II-continued
ANALYSIS OF PHOSPHATE ESTERS OF STEARYL ALCOHOL 120 (eq.wt./POP in poly P
71 (eq.wt./POP in $P_2O_5$
was included.
The numbers in parentheses are moles per mole of phosphorous, calculated by $$\frac{ml. \times \text{normality of NaOH} \times 10^{-3}}{\text{wt. sample} \times \% \text{ Poly P or } P_2O_5/\text{eq.wt. per P of Poly P or } P_2O_5}$$

The equivalent wt. per P for poly P is 85.2, the equivalent wt. per P for $P_2O_5$ is 71.
If both Poly P and $P_2O_5$ were completely hydrolized they would yield 3.0 moles per mole of phosphorous, or 1.0 moles per break.

Note 3: These numbers are moles of ester per 100 g. of Poly P.
The moles of diester - difference between the first break and the second break.
The moles of mono ester - moles between the first and second break less the moles of $H_3PO_4$.
Calculating in this way assumes no POP bonds in the final product either as esters or as free acid.

Phosphate rock defoamers are evaluated on a laboratory scale by many different procedures, but all of them essentially measure a reduction in the volume of foam or an increase in the rate at which foam falls when a source of gas ($CO_2$ or air) is introduced into either crude phosphoric acid, which contains dispersed and dissolved naturally occurring organic impurities or when phosphate rock is added to sulfuric acid, thus releasing the same organic impurities. All of the tests are carried out hot (at 70° to 85° C) to equal plant practice. The phosphoric acid concentration is normally around 35%, which also is in the range of plant practice. The level of defoamer used in plant practice varies considerably, depending on the throughput load on the plant, and the nature of the rock being processed. In bench scale tests, it is varied through a range which will show differences in performance between different products.

The effect of defoamers on the rubber, which is used to line the reactors, is determined according to a so-called "Rubber Test" by soaking small circular cut pieces (1 inch in diameter) in approximately 100 ml. of the defoamer, for 72 hours, at about 80° C. The percent increase in weight of the rubber is determined at intervals during this period, and the general condition of the rubber is noted. The less the weight gain, the lower is the degree of attack on the rubber.

EXAMPLE 1
(I-(III)-69-C and W-54)

To 142.2 g. of the still residues from oxo octyl (branched) alcohol production obtained from Enjay Chemical Company and containing approximately 60% alcohols, was added:
32.3 g. of 115% polyphosphoric acid
The mixture was heated to 50° C, at which point the polyphosphoric acid dissolved and reaction began as evidenced by a spontaneous temperature rise. The solution was heated to 102°–105° C., and held for 1½ hours.

The Rubber Test was run on this product and it was found to have a much lower degree of swelling action than did a standard commercial product composed of 80% tall oil fatty acid and 20% of the tall oil (mono) ester of polyethylene glycol 400. (Commercial Product A).

|       | % Increase in Weight |                       |                  |
|-------|----------------------|-----------------------|------------------|
| Hours | Product of Example 1 | Commercial Product A  | Octyl Residue    |
| 0     | 0                    | 0                     | 0                |
| 16    | 20.1%                | 45.4%                 | 55%              |
| 32    | 29.7%                | 60.1%                 |                  |
| 48    | 36.2%                | 70%                   |                  |
| 72    | 43.5%                | 88%                   | 107%             |
| + 2 weeks at room temperature | 20.0% | 82.3%        |                  |
| Appearance | Original shape  | Badly swollen         |                  |

EXAMPLE 2
Defoaming Test (W-64 and 5)

To a slurry of 200 g. of finely ground phosphate rock in 200 ml. of water, is added 0.10 ml. of a 5% emulsion of the defoamer prepared in Example I in water (or in phosphoric acid if necessary to get a good emulsion or dispersion). Then 100 ml. of 96% sulfuric acid is added with good stirring. The mixture spontaneously heates to 78° C. It is transferred to a 1 liter graduate thermostated at 95° C (to compensate for the cooling effect of the air). Air is sparged through the mixture at a rate of 1000 cc/min. through a 40 mm × 10 mm sintered polypropylene sparger. The foam height is recorded every minute.

|             | Product of Example 1 | Commercial Product A |
|-------------|----------------------|----------------------|
| (p. 47, 51) | Foam Height in cc's  |                      |
| start       | 500                  | 500                  |
| 1 min.      | 550                  | 550                  |
| 2 min.      | 600                  | 650                  |
| 3 min.      | 600                  | 700                  |
| 4 min.      | 600                  | 750                  |
| 6 min.      | 600                  | 800                  |

The results illustrate the greater defoaming capability of the phosphate ester.

EXAMPLE 3
(p PE II-18-C)

A. A crude C20+ alcohol is produced by Ethyl Corporation and sold as Epal C20+. It is a by-product from the production of synthetic fatty alcohols by a process in which ethylene is polymerized to give a maximum product in the $C_{12}$ to $C_{18}$ range and the crude polymer hydroxylated and purified by distillation. The still residues left after the alcohols up to $C_{18}$ have been removed by distillation is a blend of linear and branched alcohols in carbon number range of $C_{20}$ through $C_{32}$ and hydrocarbons in the carbon number range of $C_{24}$ through $C_{40}$. A typical analysis is:

| | |
|---|---|
| Hydroxyl value (mg. KOH/g.) | 92 |
| Acid Value (mg. KOH/g.) | 0.2 max. |
| Ester Value (mg. KOH/g.) | 10 max. |
| Iodine Value (cg. $I_2$/g.) | 15 max. |

To 191.0 g. of Epal C20+ heated to 50° C was added 30.1 g. of 115% polyphosphoric acid heated to 72° C. The mixture was stirred and heated to 110° C and held at 107°–110° C for 1½ hours.

EXAMPLE 4

(w-285)

Emulsifiers can be added to the products of examples 1, 2, or 3, and the mixtures emulsified into water to give products which are even better as defoamers and which do not attack rubber. Thus, to 100 g. of the product from Example 3, was added, 16 g. of a non-ionic emulsifier (Accospers TGH from Armstrong Chemical Co., Janesville, Wis.) made by adding about 50% ethylene oxide to a tallow monoglyceride ester and then adding about 25% by weight propylene oxide. The molten mixture is poured slowly into a solution of 30 g. of 50% sodium hydroxide in 463 g. of water heated to 50° C. The emulsion is stirred and cooled to room temperature and is thin and stable.

A Defoaming Test was run as follows: To 20 g. of finely ground phosphate rock dispersed in 35 ml. of 65% phosphoric acid, is added, 1.0 ml. of a 1% (as is basis) emulsion of the defoamer. (In the case of the product of this example, the concentration of the active defoamer in the 1% emulsion is 0.215%). Then, 28.5 g. of 96% sulfuric acid is added. The temperature rises to 75° C and is further raised to 90° C. The slurry; stirred well by hand, is poured into a 100 ml. graduate, in a constant temperature, both held at 95° C 1° C. A porous (polypropylene) air sparger is placed in the graduate, the liquid level noted and air sparged through the phosphoric acid mixture at a rate of 500 cc/min. The height of the foam is noted every 30 seconds until foam goes over the top of the graduate. The sparger is then removed and another 1.0 ml. of 1% defoamer emulsion added and the foaming procedure repeated. (Alternatively, defoamer can be added without prior dilution at a level of 5 lambda for each addition).

| Emulsion Product of Example 4 (1% Emulsion - 0.21% "Active") | | | Commercial Defoamer 1% Emulsion | | |
|---|---|---|---|---|---|
| | Foam Height | | | Foam Height | |
| Emulsion Added | 1.0 ml. | + 1.0 ml. | 1.0 ml. | + | 1.0 ml. |
| 30 sec. | 95 | 68 | 90 | | 70 |
| 1 min. | 105 | 68 | 95 | | 70 |
| 2 min. | 105 | 70 | 100 | | 70 |
| 3 min. | 125 | 72 | 105 | | 70 |
| 4 min. | over | 73 | 125 | | 70 |
| 5 min. | | 75 | 128 | | 71 |
| 6 min. | | 77 | 131 | | 71 |
| 7 min. | | 80 | over | | 71 |
| 8 min. | | 81 | | | 71 |
| 10 min. | | 88 | | | 71 |
| 12 min. | | 100 | | | 71 |
| 15 min. | | 110 | | | 71 |

It is thus readily apparent that 0.0042 ml. of the non-aqueous portion of Example 4 (2.0 ml. × 21.5%) is more effective in holding down the foam than is 0.01 ml. of the Commercial Defoamer A (a mixture of non-ionic surfactant and crude tall oil fatty acid).

EXAMPLE 5

Mixtures of the phosphate esters of higher fatty alcohols (solids) can advantageously be mixed with the phosphate esters of lower alcohols ($C_6$ to $C_{12}$). The alcohols can be mixed together first and then phosphated, or can be first converted to the phosphate esters and then mixed. Such mixtures are readily soluble in one another. And since both are good defoamers, the ratio of the solid phosphate ester to the liquid phosphate ester may be adjusted to give products with the precise spreading and defoaming behavior needed for specific phosphate rock digestors or for suitable physical form to meet the handling requirements of different mines. A mixture comprising at least 25% of $C_{14}$ to $C_{26}$ aliphatic alcohol esters and the remaining $C_6$ to $C_{12}$ aliphatic alcohol esters is also desirable.

A. Thus, a mixture of 75 parts of Continental Oil Co.'s C20+ alcohol and 25 parts oxo octyl alcohol crude (Union Carbide Corp.) is mixed with 35.4 parts of polyphosphoric acid. The mixture was heated to 110° C for 1 hour, cooled and mixed with 10.8 parts dodecylbenzene sulfonic acid (AAS-98S) (Continental Chemical Co.)). The whole mixture was then poured into 181.5 parts of water containing 10.8 parts of 50% aqueous sodium hydroxide.

The resulting emulsion is stable and thin. It is as an effective defoamer as sulfonated oleic acid, a premium defoamer used in the production of phosphoric acid.

In a similar manner, the following emulsions were prepared from the phosphate ester of Epal C20+ from Ethyl Corporation.

| | |
|---|---|
| (B) | 64.7% Epal C20 + phosphate ester |
| | 17.9% Crude Tall Oil Fatty Acid |
| | 17.4% Accosperse TGH |
| (C) | 16.7% Epal C20 + phosphate ester |
| | 2.7% Accosperse TGH |
| | 3.1% 30% Ammonia |
| | 77.5% Water |
| (D) | 27.4% Epal C20 + phosphate ester |
| | 2.2% DiAcid from Weastvaco (the acrylic acid adduct of linoleic acid) |
| | 8.4% 50% sodium hydroxide |
| | 62.0% Water |

All three products (B–D) were effective defoamers. The product of example 5-B caused moderate rubber swelling. All the others caused only minimal rubber swelling (measured on the anhydrous products before converting them to emulsions).

EXAMPLE 6

In a similar manner, the following phosphate esters were prepared and evaluated as defoamers for the wet phosphoric acid process.

| Base Alcohol | Defoamer Level Lbs. of defoamer per ton of $P_2O_5$ (On a 100% active basis) | Defoaming Performance (Time to 1300 ml. of foam) |
|---|---|---|
| Neodol 45 (mixed oxo alcohol $C_{11}$–$C_{15}$ from Shell) | 0.29 | 6.0 min. |
| Alfol 1620 (Continental Oil) (mixed straight chain alcohols: $C_{16}$, $C_{18}$, $C_{20}$) | 0.29 | 15 min. |
| Alfol 1418 (mixed straight chain | 0.29 | 15 min. |

| Base Alcohol | Defoamer Level Lbs. of defoamer per ton of $P_2O_5$ (On a 100% active basis) | Defoaming Performance (Time to 1300 ml. of foam) |
|---|---|---|
| 14, 16, 18 carbon alcohols) | | |

EXAMPLE 7

Sulfates and sulfonates are known to be good defoamers. Surprisingly, phosphate esters exceed these compounds in effectiveness, as defoamers.

| | Defoamer Level (Lbs. of defoamer (anhydrous) per ton of $P_2O_5$ | Defoamer Performance (time to 1000 ml. of foam) |
|---|---|---|
| Isooctyl sulfate | 0.31 | 42 sec. |
| Hexyl Sulfate | 0.31 | 75 sec. |
| Epal 610-($P_2O_5$) Phosphate | 0.31 | >4 min. |
| Epal 1620 (Poly-Phosphoric Acid) Phosphate | 0.16 | 4 min. |

Epal 610 a mixture of straight chain even carbon number alcohols from $C_6$ to $C_{10}$ made by Ethyl Corp. has a hydroxyl number of 420. To 132 g. of the alcohol was added 58 g. of $P_2O_5$ (in 1 hr.) and the mixture heated with stirring to 120° C to give Epal 610 phosphate.

Epal 1620 phosphate was made by the procedure of Example 3 from Epal 1620, a mixture of pure $C_{16}$, $C_{18}$ and $C_{20}$ alcohols.

The sulfates were prepared by dissolving the alcohols in 96% sulfuric acid (in excess).

EXAMPLE 8

Phosphate esters were prepared by the method described below.

A mixture of one part of Union Carbide HCO-R alcohol (a by-product containing about 60% $C_3$–$C_8$ alcohols and 40% hydrocarbons) and three parts of Continental Oil Co.'s Alfol C20+ (containing about 70% $C_{20}$–$C_{28}$ alcohols and 30% hydrocarbons) is heated to 60° C. To the molten alcohols is added polyphosphoric acid ("115%") equal to 35% of the weight of the alcohol mix. The acid is added slowly with stirring over a period of ½ hour. The mixture is then heated to 110° C for 1 hour, then allowed to cool. The product was an excellent defoamer in the acidification of phosphate rock, and had a very low degree of attack on rubber.

EXAMPLE 9

Emulsions were all prepared by the following method. The phosphate ester is melted and mixed well with the chosen emulsifier. With rapid stirring molten phosphate ester-emulsifier mixture is poured into hot (50° C) water containing a predetermined quantity of base. The resulting emulsion is allowed to cool while being stirred.

The compositions and stabilities of several emulsions prepared as described above are given in the following tables. The emulsion in each case consists of 25% of the phosphate ester of Example 8 plus the percentage of added emulsifier and alkalie as indicated.

Defoamer Emulsions

The phosphate ester of Alfol C20+ (Continental Oil Co.) was prepared as follows:

| | Emulsifier | Base | Stability |
|---|---|---|---|
| 2.5% | DiAcid 1550 Adduct of acrylic acid and linoleic acid | $NH_3$ 3% | Good emulsion |
| 2.5% | AAS-98S Dodecylbenzene sulfonic acid | $NH_3$ 2.7% | Good emulsion |
| 2.5% | AAS-98S | NaOH 2.5% $NH_3$ 0.75% | Excellent emulsion thick |
| 2.5% | Sulfonated oleic acid | $NH_3$ 1.5% | Good emulsion thick |
| 2.5% | di-2-ethylhexyl sulfosuccinate. | NaOH 2.5% $NH_3$ 0.75% | Good emulsion |
| 5% | DiAcid 1550 | NaOH 2.3% | Good, thick emulsion |
| 2% | AAS-98S | NaOH 2% | Good, fairly thin emulsion |
| 2.5% | Neodol 25-7 (Shell Chem. Co) $C_{12}$–$C_{15}$ linear alcohol ethoxylate with 7 moles Ethylene oxide | NaOH 2.7% | Excellent, thin emulsion |
| 2.5% | Bubble Breaker PR (Witco Chemical Corp., Sulfonated Oleic Acid) | NaOH 1.25% | Good, thick emulsion |
| 2% | Accosperse TGH (Armstrong Chem. Co.) Ethoxylated, propoxylated tallow monoglyceride | NaOH 1% | Good, thin emulsion |
| 2.5% | Acintol FA-1 (Arizona Chemical Co.) Tall Oil Fatty Acid | NaOH 1.3% | Good, very thick emulsion |
| 2.5% | Ethomeen 18/25 (Armak Chemical Co.) Stearylamine ethoxylate, 15 moles ethylene oxide | NaOH 1.3% | Good, very thick emulsion |
| 2.5% | Aerosol OT (American Cyanamide Co.) | NaOH 1.3% | Good, very thick emulsion |
| 2.5% | Neodol 25-3S (Shell Chemical Co.) sulfated $C_{13}$(ave) alcohol + 3 ethylene oxide units | NaOH 1.3% | Good, very thick emulsion |

The above emulsions were all found to have a very low degree of attack on rubber. All the emulsions were stable and capable of being handled, pumped and metered at ambient temperatures.

EXAMPLE 10

A phosphate ester was prepared from a mixture of 80 parts Continental's C20+ alcohol, 20 parts of decyl alcohol (from Exxon, a branched chain oxo alcohol) and 32 parts of polyphosphoric acid, by the procedure of Example 5. [The mixture without neutralization was an excellent defoamer for acidifying phosphate rock.]

The mixture while still molten was poured into 300 parts water containing 8 parts of sodium hydroxide with stirring, and then cooling and stirring.

The resulting emulsion was as good a defoamer as the anhydrous material and also was very low in rubber attack.

Similarly phosphate ester mixtures were prepared from the following mixtures (in each case 32 parts polyphosphoric acid being used):

A. 80 parts Alfol 1418, a blend of $C_{14}$ to $C_{18}$ straight chain alcohols and 20 parts Alfol 1012, a blend of $C_{10}$ to $C_{12}$ straight chain alcohols as produced by Continental Oil Co.

B. 70 parts Alfol 1418 (as above) 30 parts Alfol 6, a straight chain $C_6$ alcohol.

C. 90 parts Epal C20+ a mixture of about 40 parts hydrocarbon boiling above the boiling point of $C_{18}$ alcohol and 60 parts of $C_{18}$ to $C_{26}$ straight chain alcohols, 10 parts Epal 810, a mixture of $C_8$ to $C_{10}$ straight chain alcohols.

All of the above were good defoamers for the process of acidifying phosphate rock. They had a very low degree of attack on rubber.

In carrying out the invention the defoaming agents herein described may be added to the acidulation reaction of phosphate rock and sulfuric acid in the manner heretofore employed with currently used defoaming agents. Such expedients will be well understood to those skilled in the art. In general the addition of the defoaming agents according to the present invention in the order of 1 to 30 pounds per ton of phosphate rock is effective. Further details of this foaming problem and some of the test procedures used to evaluate foam control agents are discussed in a paper presented at the Society of Mining Engineers Fall Meeting Oct. 13–15, 1966 "Evaluation of Foam Control Agents for Wet-Process Phosphoric Acid Systems" by Carbino, Encke, and Geoghegan of Arizona Chemical Co., and in a paper presented by Foley and Bauman, "Laboratory Evaluation of Defoamers for Wet Process Phosphoric Acid Systems" 150th National Meeting of the American Chemical Society, Atlantic City, N.J., September, 1965.

It will be understood that the phosphate ester emulsions herein described particularly those comprising the esters of $C_{16}$ and higher alcohols are novel compositions of matter having unexpected and advantageous properties rendering them useful for a variety of purposes including, in addition to that described herein those uses described in my copending application Ser. No. 615,176 filed concurrently herewith.

It will be further understood that this invention is not limited to the specific embodiments herein described but its scope is to be determined by reference to the following claims. Numerous modifications in the practice of the invention may be made without departing from the scope of the invention as set forth in the claims.

I claim:

1. In the process of converting naturally occurring phosphate rock to phosphoric acid by reaction thereof with sulfuric acid, the improvement comprising adding to said reaction mixture a defoaming agent comprising a mixture of the acid phosphate esters of $C_6$ to $C_{12}$ aliphatic alcohols and $C_{14}$ to $C_{26}$ aliphatic alcohols in which the mixture of said phosphate esters contains at least 25% of the $C_{14}$ to $C_{26}$ alcohol ester.

2. A process according to claim 1 wherein both of said acid phosphate ester are each selected from the group consisting of mono and dialkyl esters of phosphoric acid and polyphosphoric acid.

3. A process according to claim 1 wherein said defoaming agent contains a paraffin having a boiling point in the range of the higher alcohol moiety of the phosphate esters said paraffin comprising at least 17% of the $C_{14}$ to $C_{26}$ alcohol phosphate esters.

4. A process according to claim 1 wherein said esters are added in the form of an aqueous emulsion.

5. A process according to claim 4 wherein said acid phosphate esters are salts selected from the group consisting of ammonium, alkanolamine, lower alkyl amine, and the alkali and alkaline earth metals.

6. A process according to claim 4 wherein said emulsion contains an anionic emulsifying agent taken from the group consisting of alkylsulfates, alkylsulfonates, alkylarylsulfonates, sulfated nonionic surfactants, sulfonated and sulfated fatty acids, sulfosuccinate esters, dicarboxylic acids, and amphoteric surfactants.

* * * * *